(No Model.)

F. ANDERSON.
PIPE CLAMP.

No. 570,975.

Patented Nov. 10, 1896.

Witnesses:
L. C. Hills
A. L. Hough

Inventor:
Fredrick Anderson
by Grosv & Co.
Attys.

By

THE NORRIS PETERS CO., PHOTO-LITHO., WASHINGTON, D. C.

UNITED STATES PATENT OFFICE.

FREDRICK ANDERSON, OF LANTZ, PENNSYLVANIA.

PIPE-CLAMP.

SPECIFICATION forming part of Letters Patent No. 570,975, dated November 10, 1896.

Application filed May 28, 1896. Serial No. 593,407. (No model.)

*To all whom it may concern:*

Be it known that I, FREDRICK ANDERSON, a citizen of the United States, residing at Lantz, in the county of McKean and State of Pennsylvania, have invented certain new and useful Improvements in Pipe-Clamps, of which the following is a specification, reference being had therein to the accompanying drawings.

This invention relates to certain new and useful improvements in detachable pipe-couplings; and the object of the invention is to provide a sectional coupling for use in connection with gas, water, or conduit pipes to prevent leakage, securely holding the ends of the pipes against any lateral displacement.

A further purpose of the invention is to provide a detachable coupling, made preferably in section, each ring or pipe-clamp being made of two pieces with their ends having dovetail connection, the said rings being recessed out on their inner sides and adapted to fit over the flanged or beaded ends of the pipes to be connected, and the rings or clamps held or clamped by means of tightening-bolts which are diagonally disposed from ring to ring with the heads of the bolts and the nuts thereon pulling against flattened shoulders on the rings and about the perforations through which the bolts or tightening-screws are inserted.

Another and an important feature of my invention resides in the provision of a coupling of the character described, which is made to fit pipes of standard size and temporarily used to check leaks in pipes which are connected together by various means, but which become loose at joints, the clamping-rings being made sectional, rendering it possible to apply the rings without the necessity of slipping the same over the ends of the pipes, and when the sections of the rings are held together by the dovetailed connections will withstand any amount of outward pressure that may be brought upon them.

To these ends and to such others as the invention may pertain the same consists, further, in the novel construction, combination, and adaptation of the parts, as will be hereinafter described, and then specifically defined in the appended claim.

I clearly illustrate my invention in the accompanying drawings, which, with the letters of reference marked thereon, form a part of this specification, and in which drawings similar letters of reference indicate like parts throughout the several views, in which—

Figure 1:
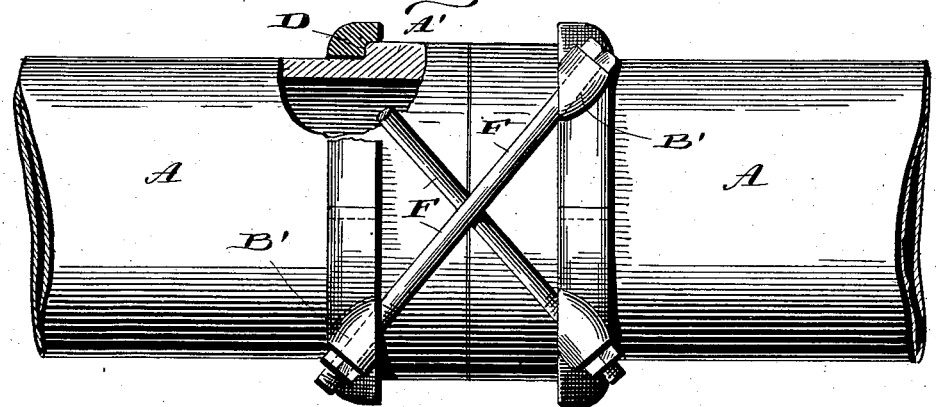
Figure 2:
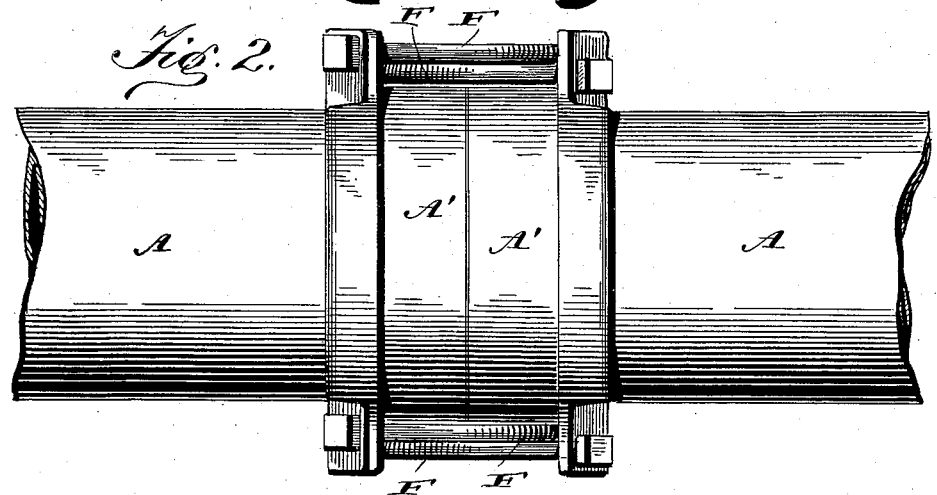
Figure 3:
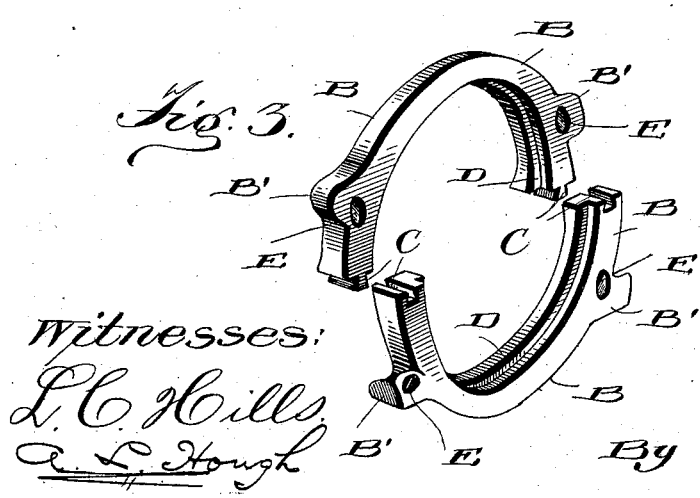

Figure 1 is a side elevation of my improved couplings shown as attached to the meeting ends of two pipes, a portion being broken away to bettter illustrate the connection. Fig. 2 is a similar view, but in a plane at right angles to the plane of Fig. 1. Fig. 3 is an enlarged detail in perspective of the sectional rings, showing the dovetailed means for connecting their ends.

Reference now being had to the details of the drawings by letter, A A designate two pipes having flanged ends A', which are to be clamped together by my improved tightening-clamps. The rings B are made up of two sections, and their ends are provided with dovetailed connections, as seen at C, whereby, after the sections have been applied to the ends of the pipes, they may be securely held together and withstand an outward strain quite as well as though the ring was made up of a single piece and much more convenient for adjustment to the pipes, as it is not necessary to slip the ring over the end of the pipe.

An annular recess D is made in the inner ends of the ring-sections, so that the sections may snugly fit over the flanges of the pipes. Through the ring-sections near each end are made inclined apertures E, and the sections are reinforced near each aperture by the projections B' and are flattened on their outer sides in a plane at right angles to the inclined apertures, so as to form a seat for the heads of the bolts F, as well as for the nuts carried thereon. As will be seen in the drawings, the bolts extend diagonally from ring to ring and cross at their longitudinal centers, and the bolts have an even direct pull on the flattened shoulders.

By having the bolts F disposed diagonally the ring-sections are drawn tightly up to the collars, and also the ring-sections are kept tightly around the end of the collar on the pipe, which is an advantage not obtained by bolts drawing only in one direction, as with couplings commonly used. It is very important that the clamp-sections should be tight around the pipe as well as to the collar, as under the expansion and contraction of the metal, due to variation in temperature, leaks are apt to be caused thereby. Furthermore, by having the bolts diagonally disposed it offers a chance to have the burs on the top of the clamp or sectional rings, making it much more convenient to screw on or off the same than would be the case if the bolts were longitudinally disposed.

By my peculiar construction of coupling only four bolts are employed, regardless of the size of the pipes on which the couplings are used, as it will be quite impossible for the clamp-sections to bend.

Having thus described my invention, what I claim to be new, and desire to secure by Letters Patent, is—

In a detachable coupling for pipes, the combination with the two-part rings having dovetailed connections, the said sections annularly recessed, projections B' on said sections, of the tightening-bolts F diagonally disposed in inclined apertures between the said ring-sections, and flattened shoulders on which the heads of the bolts and the nuts thereon, are adapted to rest, substantially as shown and described.

In testimony whereof I affix my signature in presence of two witnesses.

FREDRICK ANDERSON.

Witnesses:
CHARLES PAULSON,
M. H. BYLES.